Jan. 9, 1940.   H. E. SMYSER   2,186,790
TRASH RACK RAKE
Filed Sept. 16, 1938   5 Sheets-Sheet 1

INVENTOR
HARRY E. SMYSER
By Malcolm F. Gannett
ATTORNEY

Jan. 9, 1940. H. E. SMYSER 2,186,790
TRASH RACK RAKE
Filed Sept. 16, 1938 5 Sheets-Sheet 2

INVENTOR
HARRY E. SMYSER
By Malcolm F. Gannett
ATTORNEY

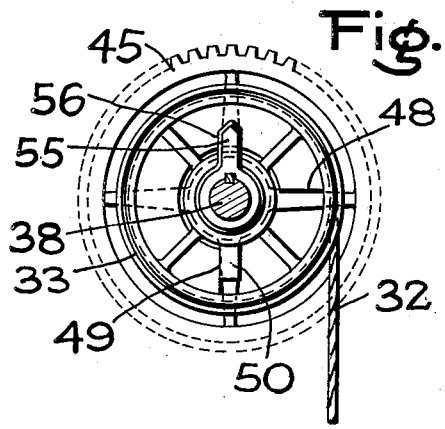
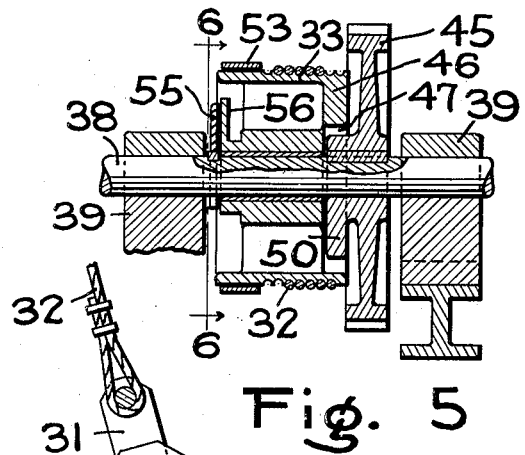
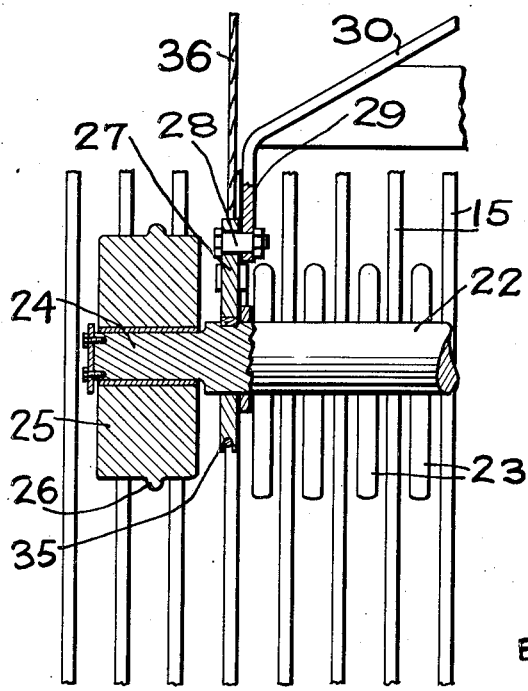
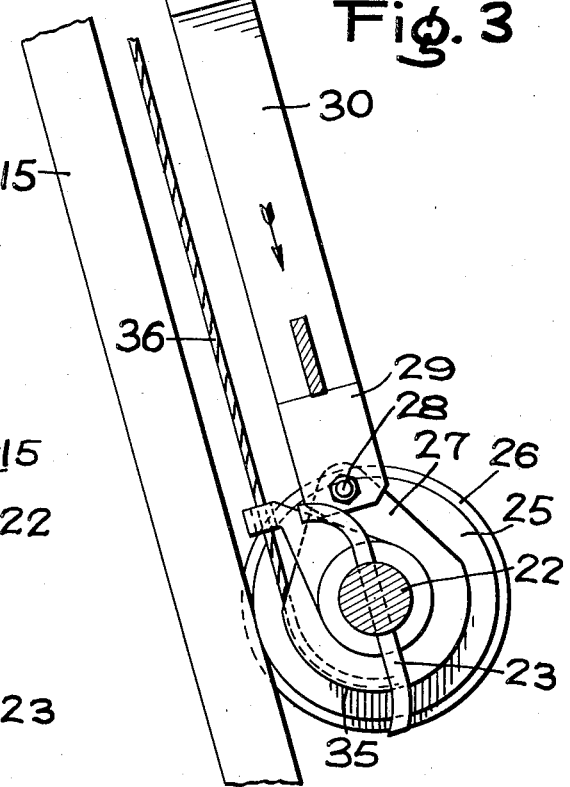

Jan. 9, 1940.  H. E. SMYSER  2,186,790
TRASH RACK RAKE
Filed Sept. 16, 1938   5 Sheets-Sheet 4
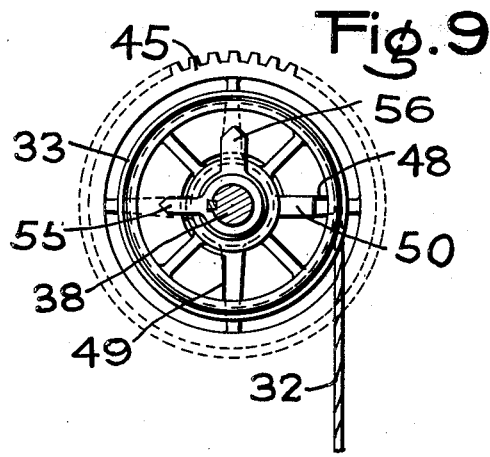
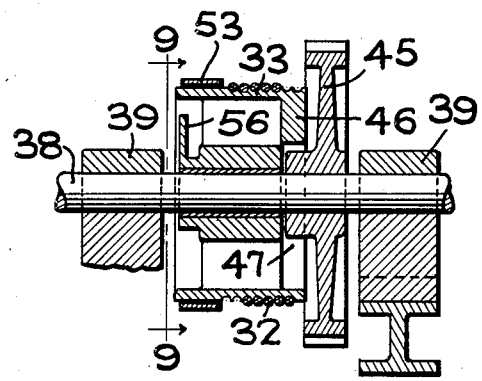
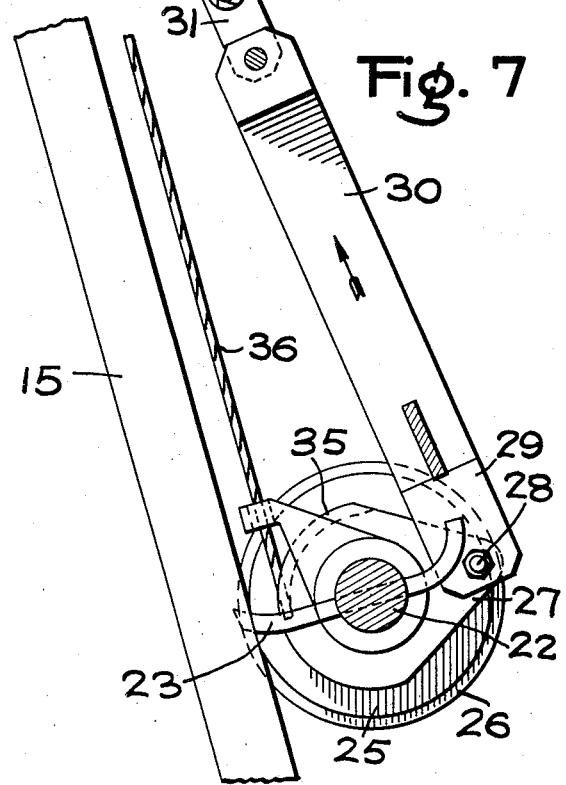
INVENTOR
HARRY E. SMYSER
By Malcolm T. Gannett
ATTORNEY

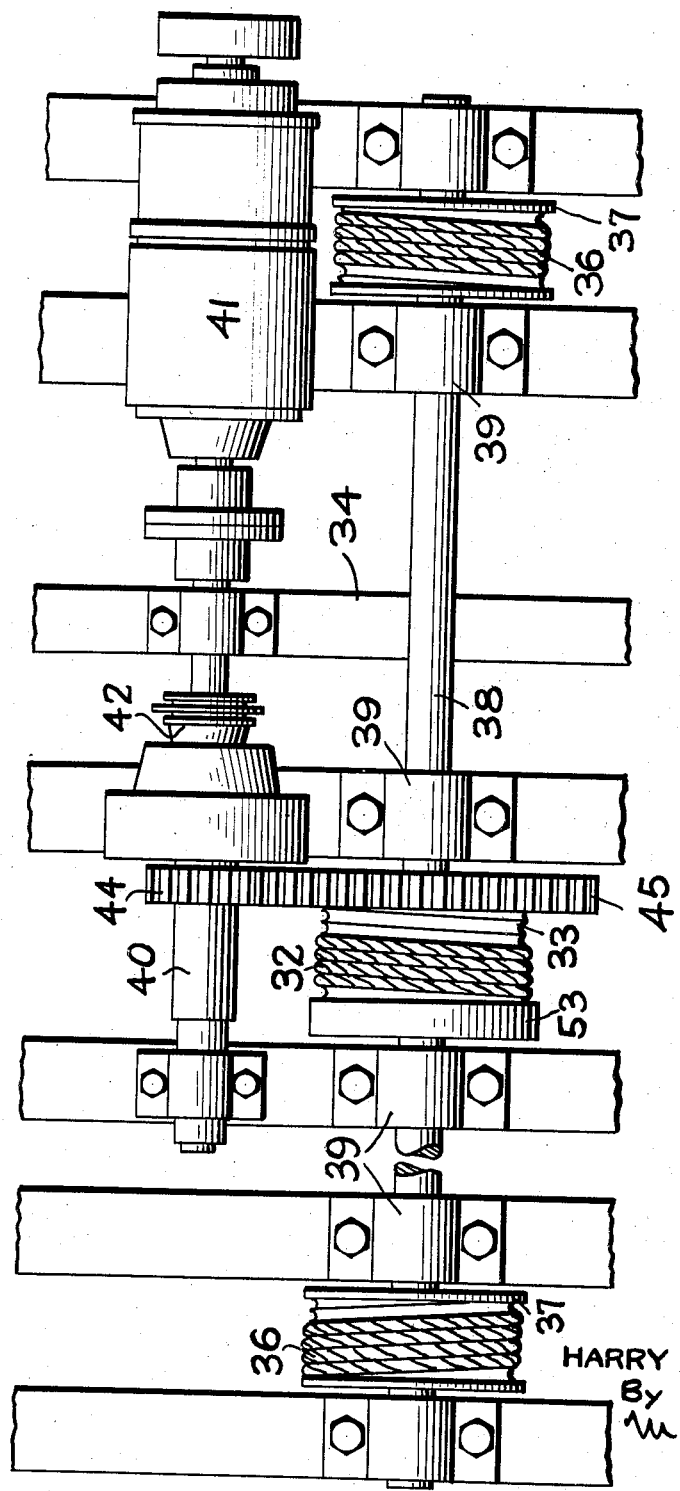

Patented Jan. 9, 1940

2,186,790

UNITED STATES PATENT OFFICE 2,186,790

TRASH RACK RAKE

Harry E. Smyser, York, Pa., assignor to S. Morgan Smith Company, York, Pa., a corporation of Pennsylvania Application September 16, 1938, Serial No. 230,253

5 Claims. (Cl. 210—176)

This invention relates to rakes of the type employed to remove trash from racks or gratings placed across the intakes of water wheel flumes, mill races and the like, to arrest matter which otherwise would be carried by the water into the machinery.

An object of the invention is to provide an improved trash rack rake in which the teeth of the rake are adapted to be disposed in such a position that the rake will readily descend past the trash and can be moved into a position to catch and raise the trash on its upward movement and can be dumped free of all trash or logs when in its raised position.

Another object of the invention is to provide an improved trash rack rake in which the operating mechanism for the rake includes automatic means for controlling the position of the rake.

With the foregoing and other objects and advantages in view, the invention consists in the construction and arrangement of the several parts which will be hereinafter more fully described and claimed.

In the accompanying drawings:

Fig. 3 is an enlarged detail transverse section of the rake, showing the same on the trash rack, the parts being in the position assumed when the rake is descending the trash rack;

Fig. 4 is a front elevation, partly in section, of an end portion of the rake shown in Fig. 3;

Fig. 5 is a vertical longitudinal section of a portion of the rake hoisting mechanism showing the same in rake lowering position;

Fig. 6 is a vertical transverse section taken on the line 6—6 of Fig. 5;

Fig. 7 is a view similar to Fig. 3, the rake being shown on the trash rack in its ascending position;

Fig. 8 is a section showing the relative position of the hoisting mechanism shown in Fig. 5 when the rake is being hoisted;

Fig. 9 is a vertical transverse section taken on the line 9—9 of Fig. 8; and

Fig. 10 is an enlarged plan of the hoisting mechanism.

Figure 1:
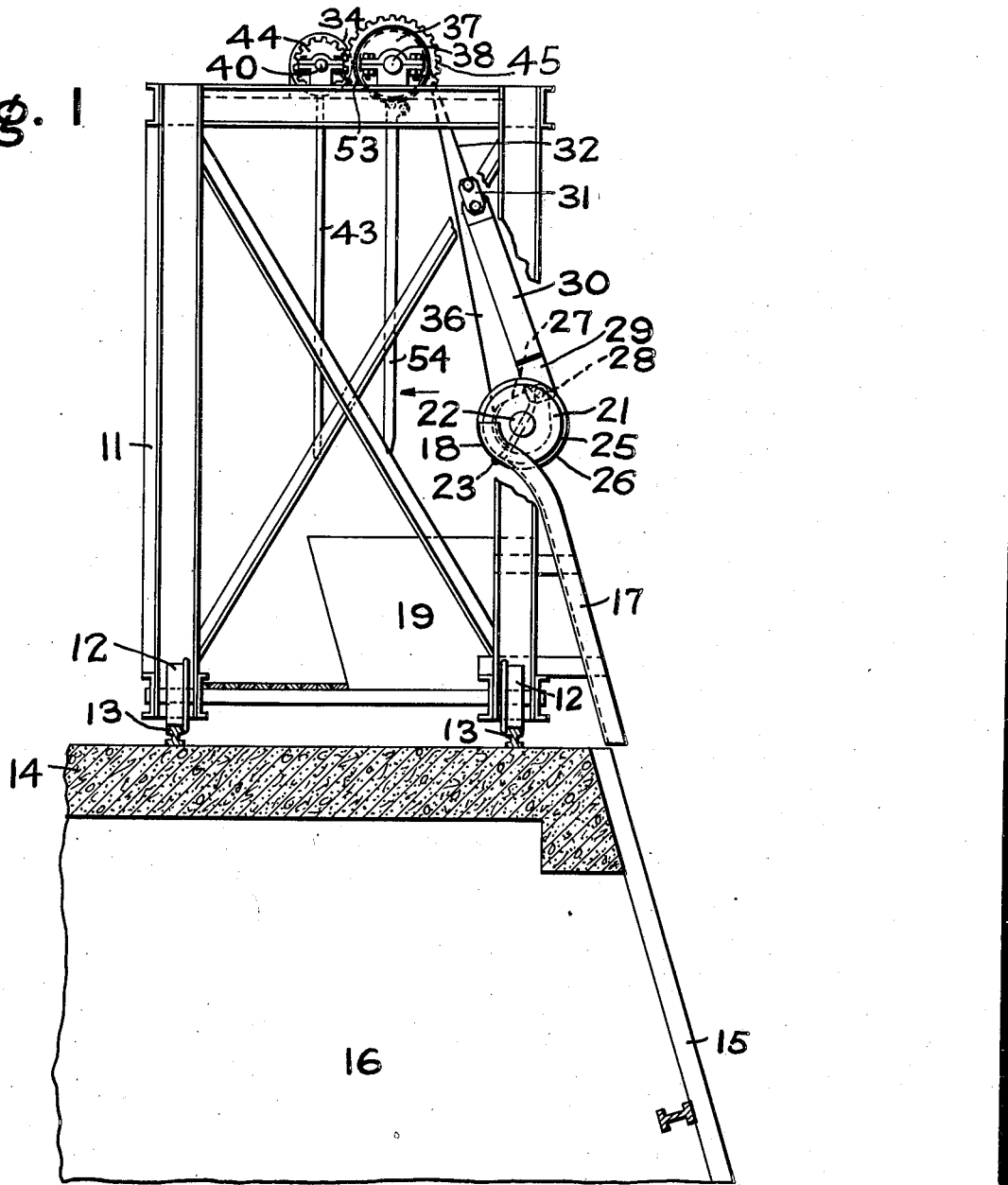
Figure 1 is a vertical transverse section of a trash rack showing the rake and its carrying frame and associated parts in end elevation, the rake being shown in elevated position above the trash rack.
Figure 2:
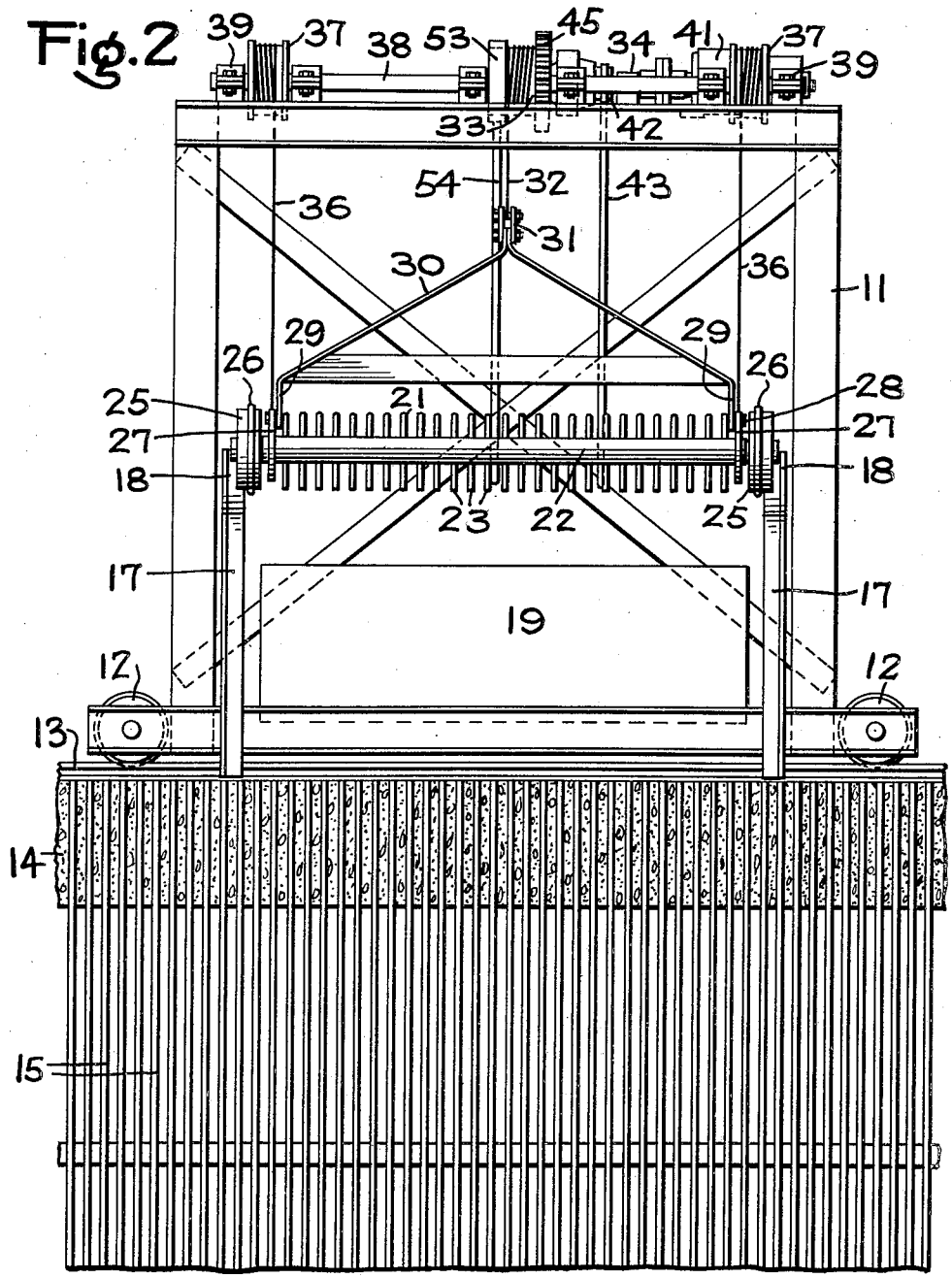
Fig. 2 is a front elevation of the structure shown in Fig. 1.

Referring to the drawings the improved trash rack rake comprises a car 11 in the form of a skeleton frame having wheels 12 by which the car can be moved along a track 13 mounted on top of the concrete structure 14 of a dam or the like.

Also supported from the concrete structure 14 is a series of bars 15, which constitute a grating or screen for the intake of the flume, mill race or the like, indicated at 16 (Fig. 1).

The trash rack bars 15 may be disposed either vertically or obliquely. In the present instance such bars are shown obliquely disposed.

Supported from the frame of the car 11 and extending downwardly towards the trash rack bars 15 is a pair of spaced angle tracks 17. These tracks are adapted to support the rake 21 when the latter is elevated above the upper ends of the bars 15, and the upper ends of said tracks are bent inwardly as indicated at 18, so that the rake will be positioned to discharge trash collected thereby towards a bin 19 supported by the car 11.

The rake 21 comprises an elongated shaft 22 having fixed thereto and projecting therefrom a plurality of teeth 23.

The rake teeth 23 may be formed from stout metal rods which are spaced apart so as to enter the spaces between the bars 15.

The opposite ends of the shaft 22 are formed with axle arms 24, on which are rotatably mounted wheels 25, adapted to run on the bars 15 and also the tracks 17.

The wheels 25 are formed with peripheral ribs 26 which are adapted to enter between the bars 15 and thereby prevent lateral displacement of the rake on the grating or screen.

Mounted on the end portions of the shaft 22 and in proximity to the axle arms 24, are cranks 27.

The cranks 27 extend outwardly from the shaft 22 a suitable distance and have pivotally connected thereto, as indicated at 28, the downturned ends 29 of a V-shaped bail 30.

The apex portion of the bail 30 carries links 31 to which is connected one end of a cable 32 wound around a drum 33 of the hoisting mechanism 34 of the apparatus.

Each crank 27 is formed with a grooved arcuate peripheral portion 35 which is concentric to the center of rotation of the shaft 22.

At a point in the portion 35 of each crank 27 approximately diametrically opposite to the pivot 28, there is secured to the crank 27 one end of a cable 36 (see Fig. 3).

There are two cables 36, one at each end of the rake 21, and these cables are wound around drums 37 of the hoisting mechanism 34, (see Fig. 10).

The drums 33 and 37 are mounted on a shaft 38 journalled in suitable bearings 39 supported in the upper portion of the car 11. The drums 37 are keyed to the shaft 38, and the drum 33 is, as shown in Figs. 5, 6, 8 and 9, not keyed directly to said shaft, but is adapted to be rotated in the manner to be hereinafter described.

Supported by the frame of the car 11 and disposed in parallel relation to the shaft 38, is a drive shaft 40.

Connected to the shaft 40 is an electric motor 41 which drives the shaft through a suitable clutch mechanism 42, the operation of which clutch is controlled by a lever 43.

Mounted on the shaft 40 is a gear 44 which is in meshing relationship with a gear 45 on the shaft 38. Both of these gears are keyed to their respective shafts.

One end 46 of the drum 33 is disposed adjacent one side of the gear 45, and this end of the drum 33 is formed with an opening 47 having two shoulders 48 and 49 formed therein as shown in Figs. 6 and 9.

The portion of the hub of the gear 45 adjacent to the end 46 of the drum 33 is formed with a lug 50 which is disposed within the opening 47. The opposite side walls of the lug 50 are adapted to alternately engage the shoulders 48 and 49 during operation of the device in the manner to be hereinafter described.

Operatively associated with the drum 33 is a brake mechanism including a brake band 53 and operating lever 54 therefor. This brake mechanism may be of any type, and in the present instance the lever 54 is adapted to be moved in the direction of the arrow, Fig. 1, to apply the band 53 to the drum.

In operation, the car 11 is adapted to be moved along the screen or grating provided by the bars 15 with the rake 21 in the upper position shown in Fig. 1.

After the car 11 has been positioned over a section of the screen which it is desired to clean, the rake 21 is lowered. In lowering the rake 21 the operator first shifts the lever 43 to release the clutch 42, thereby permitting free rotation of the shaft 38 and the drums mounted thereon.

As soon as the rake 21 commences to descend, the operator controls the rate of speed of the rake by operating the brake lever 54.

During the downward movement of the rake 21 the rake teeth 23 will be pointed downwardly with the main body portions of said teeth disposed substantially parallel to the outer or front edges of the trash rack bars 15.

In its downward movement, the rake 21 is suspended solely from the cable 32 which connects the bail 30 with the drum 33, which drum functions as a braking drum for the apparatus.

When the rake 21 has descended to the bottom of the screen provided by the bars 15 and it is desired to elevate the rake in order to remove trash which has accumulated on said bars, assuming that the electric motor 41 has been set into motion through the actuation of a suitable device (not shown), the operator engages the clutch mechanism by operating the clutch lever 43. This results in gear 45 being rotated by gear 44 and consequently shaft 38 is rotated in the direction in which the drums 33 and 37 are turned to wind up the cables 32 and 36, respectively.

However, since the drum 33 is not keyed to shaft 38, said drum will not be turned at the initiation of the hoisting operation.

When the drums 37 are first turned at the commencement of the hoisting operation, the cables 36 will be drawn upwardly without imparting any upward movement to the rake 21.

This upward pull of the cables 36 results in the shaft 22 of the rake 21 being turned through a limited arc, in which the rake teeth 23 are moved upwardly and inwardly into the spaces between the bars 15.

As shown in Fig. 6, when the rake teeth 23 are disposed downwardly (see Fig. 3), the lug 50 is in engagement with shoulder 49.

When the cables 36 pull the rake teeth 23 upwardly into the raking position shown in Fig. 7, due to the rotation of the shaft 38 in operating the drums 37 to draw the cables 36, the lug 50 will be moved away from the shoulder 49 and across the opening 47 and into engagement with the shoulder 48, as shown in Fig. 9.

As soon as the lug 50 engages shoulder 48 the drum 33 will be operatively connected to the shaft 38 so that during the hoisting operation the drum 33 will be also rotated and thereby wind up the cable 32 thereon.

However, during the hoisting operation the actual lifting of the rake 21 is effected through the upward pull imparted to the cables 36 by the drums 37.

After the rake 21 has been pulled upwardly to the upper ends of the angle tracks 17 and the debris discharged therefrom into the bin 19, the car 11 can be shifted to another section of the screen provided by the bars 15 and the cleaning operation repeated.

Since the parts are in the relative positions shown by Figs. 7, 8, and 9 when the rake 21 is in its upper position, at the initiation of the rake lowering operation, as soon as the clutch mechanism 42 is disconnected or released, the operator operates the brake lever 54 to hold the drum 33 from rotating while the rake 21 swings downwardly on the pivots 28 from the position shown in Fig. 7 to the position shown in Fig. 3. During this shifting movement of the rake the lug 50 will move from shoulder 48 through the opening 47 to engage shoulder 49.

As shown in Figs. 5, 6, 8 and 9, a pointer 55 is keyed to shaft 38 and the adjacent end of the drum 33 carries a similar pointer 56. The relative positions of these pointers is such that when the pointer 55 is in alinement with the pointer 56 (Fig. 6) it is designated that the rake teeth 23 are disposed downwardly and out of the spaces between the bars 15. When the rake teeth 23 are disposed in the spaces between the rack bars 15, the pointers are angularly disposed relative to each other, as shown in Fig. 9.

Thus, during the operation of the apparatus an operator can, by referring to the position of the pointers 55 and 56, determine the corresponding positions of the teeth of the rake. Consequently, when the operator notes that the pointers are disposed in alinement with each other at the initiation of the rake lowering operation described above, can then release the brake 53 to permit gradual descent of the rake.

Since the rake teeth 23 are disposed in spaced relation to the trash rack bars 15 during the rake lowering operation, the rake will readily pass over trash which has collected on the bars. In this way the rake will not disturb the trash on the bars during the lowering operation and consequently none of the trash will be carried downwardly by the rake to the bottom of the flume.

Having thus described my invention, what I claim is:

1. A trash rack rake comprising an elongated shaft having a plurality of rake teeth, wheels mounted on said shaft and adapted to run on trash rack bars, a crank fixed to each end portion of said shaft, a bail having its ends pivotally connected to the end portions of said cranks, a cable connected to said bail, a cable connected to each of said cranks at a point offset with respect to the pivotal connection of the bail therewith, and means for raising and lowering said cables whereby the cable connected to said bail functions as a lowering cable by which the rake is lowered on the trash rack bars with its teeth pointed downwardly and in spaced relation to said bars and the cables connected to said cranks function as lifting cables by which the rake shaft is first turned preparatory to ascending the trash rack bars to move the rake teeth into the spaces between the bars.

2. A trash rack rake comprising an elongated shaft having a plurality of rake teeth, wheels mounted on said shaft and adapted to run on trash rack bars, a crank fixed to each end portion of said shaft, a bail having its ends pivotally connected to the end portions of said cranks, a cable connected to said bail, a cable connected to each of said cranks at a point offset with respect to the pivotal connection of the bail therewith, means for raising and lowering said cables whereby the cable connected to said bail functions as a lowering cable by which the rake is lowered on the trash rack bars with its teeth pointed downwardly and in spaced relation to said bars and the cables connected to said cranks function as lifting cables by which the rake shaft is first turned preparatory to ascending the trash rack bars to move the rake teeth into the spaces between the bars, said cable raising and lowering means comprising a drum for each cable, the drums for the hoisting cables being keyed directly to a drive shaft and the drum for the lowering cable being mounted on the drive shaft for limited angular movements with respect to the other drums whereby to effect the limited turning movement of the rake from one position thereof to the other position thereof with respect to the trash rack bars.

3. A trash rack rake comprising an elongated shaft having a plurality of rake teeth, wheels mounted on the end portions of said shaft and adapted to run on trash rack bars, a crank fixed to each end portion of said shaft and extending outwardly therefrom, a bail having ends pivotally connected to said cranks, a cable connected to said bail, a cable connected to each of said cranks at a point offset with respect to the pivotal connection of the bail therewith, a plurality of drums, one for each of said cables, said drums being mounted on a single shaft, lost motion means between one drum and said shaft to permit limited angular movement of said drum with respect to the other drums at the initiation of the lowering and raising operation of the rake whereby to effect limited turning movement of the rake with respect to the trash rack bars, and means for operating said drum shaft.

4. A trash rack rake comprising a shaft having a plurality of rake teeth, means for supporting said rake for reciprocatory movements over trash rack bars, a crank fixed to each end portion of said rake, a bail having its ends pivotally connected to the end portions of said cranks, a cable connected to said bail, a cable connected to each of said cranks at a point offset with respect to the pivotal connection of the bail therewith, and means for raising and lowering said cables whereby the cable connected to said bail functions as a lowering cable and the cables connected to said cranks function as lifting cables.

5. A trash rack rake comprising a shaft having a plurality of rake teeth, means for supporting said rake for reciprocatory movements over trash rack bars, a crank fixed to each end portion of said rake, a bail having its ends pivotally connected to the end portions of said cranks, a cable connected to said bail, a cable connected to each of said cranks at a point offset with respect to the pivotal connection of the bail therewith, hoisting and lowering mechanism for said cable comprising a plurality of drums, one for each cable, the drum for the cable connected to said bail having a limited angular movement with respect to the other drums at the initiation of the lowering and raising operation of the rake, whereby to effect limited turning movements of the rake with respect to the trash rack bars.

HARRY E. SMYSER.